(12) United States Patent
Morf et al.

(10) Patent No.: US 11,816,062 B2
(45) Date of Patent: Nov. 14, 2023

(54) CONTROL UNIT FOR QUBITS

(71) Applicant: INTERNATIONAL BUSINESS MACHINES CORPORATION, Armonk, NY (US)

(72) Inventors: Thomas Morf, Gross (CH); Cezar Bogdan Zota, Rueschlikon (CH); Peter Mueller, Zurich (CH); Pier Andrea Francese, Adliswil (CH); Marcel A. Kossel, Reichenburg (CH); Matthias Braendli, Otelfingen (CH); Mridula Prathapan, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/453,499

(22) Filed: Nov. 4, 2021

(65) Prior Publication Data
US 2023/0139805 A1    May 4, 2023

(51) Int. Cl.
*G06F 15/82* (2006.01)
*G06N 10/40* (2022.01)

(52) U.S. Cl.
CPC .............. *G06F 15/82* (2013.01); *G06N 10/40* (2022.01)

(58) Field of Classification Search
None
See application file for complete search history.

(56) References Cited

U.S. PATENT DOCUMENTS

| | | | |
|---|---|---|---|
| 9,774,401 B1* | 9/2017 | Borrill | H04L 9/0852 |
| 10,248,491 B1* | 4/2019 | Zeng | G06N 10/00 |
| 10,650,324 B1* | 5/2020 | Rigetti | G06F 15/16 |
| 11,460,876 B1* | 10/2022 | Nickerson | G06N 10/70 |
| 2020/0394548 A1 | 12/2020 | Das | |
| 2021/0173660 A1* | 6/2021 | Hogaboam | G06F 9/3851 |
| 2021/0342730 A1* | 11/2021 | Redmond | G06N 10/40 |

FOREIGN PATENT DOCUMENTS

| | | |
|---|---|---|
| CN | 112236785 A | 1/2021 |
| WO | 2004086295 A1 | 10/2004 |

OTHER PUBLICATIONS

Howington, et al., Interfacing Qubits with Cryogenic Logic: Read-out, 2019, IEEE, 5 pages. (Year: 2019).*
(Continued)

*Primary Examiner* — Eric Coleman
(74) *Attorney, Agent, or Firm* — L. Jeffrey Kelly

(57) ABSTRACT

The invention relates to a control unit for controlling a data transfer between a classical processor and a quantum processor with a plurality of qubits. The control unit comprises a plurality of control and read-out circuits configured for controlling and reading out the plurality of qubits. Each of the control and read-out circuits is assigned to one or more of the qubits. A controlling of the quantum processor by the control unit comprises selectively powering on a subset of the control and read-out circuits during an instruction cycle, while ensuring that the remaining control and read-out circuits are powered off during the instruction cycle. The powered-on subset of control and read-out circuits is used to control a subset of the qubits and to read out data from the subset of qubits.

24 Claims, 8 Drawing Sheets

(56) References Cited

OTHER PUBLICATIONS

Pauka, S. J. et al., A Cryogenic Interface for Controlling Many Qubits, 2019, Cornell Univ. ARXIV>quant-ph, 7 pages. (Year: 2019).*
Author Unknown, "Cryo-CMOS circuits for qubit readout and control," EPFL, Accessed: Oct. 13, 2021, https://www.epfl.ch/labs/aqua/research/cryo/mosquito/, 3 Pages.
Bardin et al., "Design and Characterization of a 28-nm Bulk-CMOS Cryogenic Quantum Controller Dissipating Less Than 2 mW at 3 K," IEEE Journal of Solid-State Circuits, vol. 54, No. 11, Nov. 2019, doi: 10.1109/JSSC.2019.2937234, pp. 3043-3060.
Bardin et al., "On the Path to Cryogenic Control of Quantum Processors," Google AI Blog, Feb. 21, 2019, https://ai.googleblog.com/2019/02/on-path-to-cryogenic-control-of-quantum.html, 5 pages.
Bardin, "Cryogenic CMOS for Control of Transmon Qubits". Google AI Quantum & University of Massachusetts Amherst, 2020 Symposium on VLSI Technology and Circuits, 56 pages.
Fowler et al., "Surface codes: Towards practical large-scale quantum computation," Phys. Rev. A 86, 032324, 2012, https://arxiv.org/abs/1208.0928v2, 56 pages.
Geck et al., "Control electronics for semiconductor spin qubits," Quantum Sci Technol. 5 (2020) 015004, Published Dec. 17, 2019, https://doi.org/10.1088/2058-9565/ab5e07, 19 pages.
Park et al., "A Fully Integrated Cryo-CMOS SoC for Qubit Control in Quantum Computers Capable of State Manipulation, Readout and High-Speed Gate Pulsing of Spin Qubits in Intel 22nm FFL FinFET Technology," 2021 IEEE International Solid-State Circuits Conference, ISSCC 2021 / Session 13 / CRYO-CMOS for Quantum Computing / 13.1, 3 pages.
Patra et al., "Cryo-CMOS Circuits and Systems for Quantum Computing Applications," IEEE Journal of Solid-State Circuits, vol. 53, No. 1, Jan. 2018, pp. 309-321.
Pauka et al., "A cryogenic CMOS chip for generating control signals for multiple qubits," Nature Electronics, vol. 4, Jan. 2021, pp. 64-70.
Riste et al. "Real-time processing of stabilizer measurements in a bit-flip code," npj Quantum Inf 6, 71 (2020). https://doi.org/10.1038/s41534-020-00304-y, 6 pages.
Van Dijk et al., "A Scalable Cryo-CMOS Controller for the Wideband Frequency-Multiplexed Control of Spin Qubits and Transmons," IEEE Journal of Solid-State Circuits, vol. 55, No. 11, Nov. 2020, doi: 10.1109/JSSC.2020.3024678, pp. 2930-2946.
Vijay et al., "Stabilizing Rabi oscillations in a superconducting qubit using quantum feedback," Nature 490, Oct. 4, 2012, https://doi.org/10.1038/nature11505, pp. 77-80.
Walden, "Analog-to-Digital Converter Survey and Analysis," IEEE Journal on Selected Areas in Communications, vol. 17, No. 4, Apr. 1999, pp. 539-550.
Charbon et al., "Cryo-CMOS for Quantum Computing", IEDM16, Downloaded on Jun. 14, 2023, pp. 13.5.1-13.5.4.

\* cited by examiner

CONTROL UNIT FOR QUBITS

BACKGROUND

The present invention relates to in general to data processing systems, in particular to a control unit for controlling a data transfer between a classical processor and a quantum processor. The invention further relates to a quantum computer and a computational system comprising such a control unit as well as a method for operating such a control unit.

Quantum computing exploits collective properties of quantum states, such as superposition, interference, and entanglement, to perform computation. A quantum computer, i.e., a computer comprising a quantum processor, performs such quantum computations using qubits. Qubits are a quantum version of the classic binary bits physically realized with two-state devices, i.e., a qubit is a two-state or two-level quantum-mechanical system. Quantum computers perform computations on the basis of quantum mechanics. Significant speedups are possible in order to solve dedicated problems, i.e., quantum computers may solve certain computational problems, substantially faster than the classical computers.

For using a quantum processor comprising a plurality of qubits, a classical computer may be required in order to provide instructions to be executed by the quantum processor and processing results that are provided by the quantum processor upon execution of the instructions. For efficiently controlling and reading out the qubits of the quantum processor, a suitable hardware architecture may be required. In particular, in view of future developments of more and more qubits comprised by the quantum processor, the contribution of the control and read-out architecture of the system to the efficiency and effectiveness of the system may gain more and more importance. For example, machines with 1000 and more qubits may have to be efficiently and effectively controlled and read out.

SUMMARY

Various embodiments provide a control unit, a method for operating a control unit, a quantum computer comprising a control unit as well as a computational system comprising a classical processor, a quantum processor and control unit as described by the subject matter of the independent claims. Advantageous embodiments are described in the dependent claims. Embodiments of the present invention can be freely combined with each other if they are not mutually exclusive.

In one aspect, the invention relates to a control unit for controlling a data transfer between a classical processor and a quantum processor with a plurality of qubits. The control unit comprises a plurality of control and read-out circuits configured for controlling and reading out the plurality of qubits. Each of the control and read-out circuits of the plurality of control and read-out circuits is assigned to one or more of the qubits of the plurality of qubits.

The control unit is configured for receiving instructions from the classical processor and controlling the quantum processor in order to execute the instructions. The controlling of the quantum processor comprises selectively powering on a subset of control and read-out circuits of the plurality of control and read-out circuits during an instruction cycle, while ensuring that the remaining control and read-out circuits of the plurality of control and read-out circuits are powered off during the instruction cycle. The subset of control and read-out circuits comprises less control and read-out circuits than the plurality of control and read-out circuits. The powered-on subset of control and read-out circuits is used to control a subset of qubits of the plurality of qubits and to read out data from the subset of qubits. The subset of qubits comprises those qubits of the plurality of qubits to which the control and read-out circuits of the powered-on subset of control and read-out circuits are assigned. The control unit is configured for transmitting the data read out from the qubits to the classical processor.

In another aspect, the invention relates to a method for operating a control unit for controlling a data transfer between a classical processor and a quantum processor with a plurality of qubits. The control unit comprises a plurality of control and read-out circuits configured for controlling and reading out the plurality of qubits. Each of the control and read-out circuits of the plurality of control and read-out circuits is assigned to one or more of the qubits of the plurality of qubits.

The method comprising receiving instructions from the classical processor and controlling the quantum processor in order to execute the instructions. The controlling of the quantum processor comprises selectively powering on a subset of control and read-out circuits of the plurality of control and read-out circuits during an instruction cycle, while ensuring that the remaining control and read-out circuits of the plurality of control and read-out circuits are powered off during the instruction cycle. The subset of control and read-out circuits comprises less control and read-out circuits than the plurality of control and read-out circuits. The powered-on subset of control and read-out circuits is used to control a subset of qubits of the plurality of qubits and to read out data from the subset of qubits. The subset of qubits comprises those qubits of the plurality of qubits to which the control and read-out circuits of the powered-on subset of control and read-out circuits are assigned. The control unit is configured for transmitting the data read out from the qubits to the classical processor.

In another aspect, the invention relates to a quantum computer comprising a quantum processor. The quantum processor comprises a plurality of qubits. The quantum computer further comprises a control unit for controlling a data transfer between a classical processor and the quantum processor. The control unit comprises a plurality of control and read-out circuits configured for controlling and reading out the plurality of qubits. Each of the control and read-out circuits of the plurality of control and read-out circuits is assigned to one or more of the qubits of the plurality of qubits.

The control unit is configured for receiving instructions from the classical processor and controlling the quantum processor in order to execute the instructions. The controlling of the quantum processor comprises selectively powering on a subset of control and read-out circuits of the plurality of control and read-out circuits during an instruction cycle, while ensuring that the remaining control and read-out circuits of the plurality of control and read-out circuits are powered off during the instruction cycle. The subset of control and read-out circuits comprises less control and read-out circuits than the plurality of control and read-out circuits. The powered-on subset of control and read-out circuits is used to control a subset of qubits of the plurality of qubits and to read out data from the subset of qubits. The subset of qubits comprises those qubits of the plurality of qubits to which the control and read-out circuits of the powered-on subset of control and read-out circuits are assigned. The control unit is configured for transmitting the data read out from the qubits to the classical processor.

In another aspect, the invention relates to a computational system comprising a classical processor and a quantum processor. The quantum processor comprises a plurality of qubits. The computational system further comprises a control unit for controlling a data transfer between the classical processor and the quantum processor. The control unit comprises a plurality of control and read-out circuits configured for controlling and reading out the plurality of qubits. Each of the control and read-out circuits of the plurality of control and read-out circuits is assigned to one or more of the qubits of the plurality of qubits.

The control unit is configured for receiving instructions from the classical processor and controlling the quantum processor in order to execute the instructions. The controlling of the quantum processor comprises selectively powering on a subset of control and read-out circuits of the plurality of control and read-out circuits during an instruction cycle, while ensuring that the remaining control and read-out circuits of the plurality of control and read-out circuits are powered off during the instruction cycle. The subset of control and read-out circuits comprises less control and read-out circuits than the plurality of control and read-out circuits. The powered-on subset of control and read-out circuits is used to control a subset of qubits of the plurality of qubits and to read out data from the subset of qubits. The subset of qubits comprises those qubits of the plurality of qubits to which the control and read-out circuits of the powered-on subset of control and read-out circuits are assigned. The control unit is configured for transmitting the data read out from the qubits to the classical processor.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
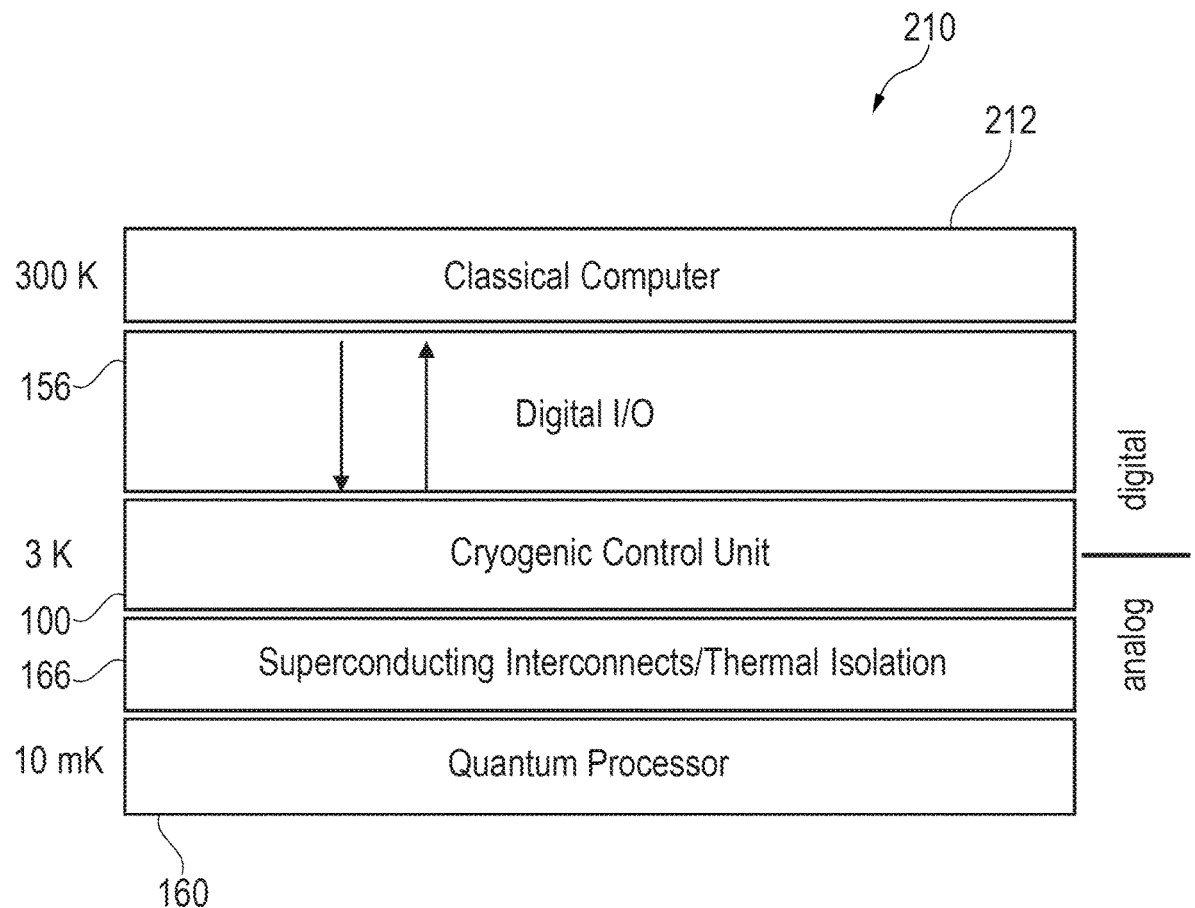
FIG. 1 depicts a schematic diagram illustrating an exemplary computational system comprising a control unit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A control unit is proposed for controlling and reading out a plurality of qubits. For example, the control unit may be operated at room temperature, i.e., above 273 K. For example, the control unit may be operated at 300 K, e.g., at the same temperature as the classical processor. For example, the control unit may be operated at temperature below 273 K. The control unit may be a cryogenic control unit, i.e., a control unit operating at a cryogenic temperature of 120 K or less. For example, the control unit is arranged in a cryostat. The control unit is a functional block, which may, e.g., also be referred to as a quantum control and read-out sequencer.

For example, the control unit may be implemented using a complementary metal-oxide-semiconductor (CMOS) integrated circuit (IC). The control unit may be implemented using a system on a chip (SoC), i.e., as an integrated circuit, also referred to as a chip, comprising all the components of the control unit.

The control and read-out circuits of the control unit may each be implemented as an integrated circuitry, preferably in CMOS technology for low leakage power consumption. A built-in power on capability for selectively powering on and off individual control and read-out circuits, may enable power saving when compared to a system with control and read-out circuits that are powered on throughout the operation of the system. As proposed herein, e.g., only those control and read-out circuits may be powered on, which are assigned to qubits required to execute a specific quantum calculation. In other systems, the control and read-out circuits for all the qubits are powered on throughout the operation of the respective system, even in case only some of the qubits are active, while other qubits are inactive.

Implementing the control and read-out circuits in CMOS technology enables a high logic density, improved scalability, lower power consumption and/or lower costs.

The control unit is configured for receiving instructions from a classical processor of a classical computational device, i.e., a classical computer. The classical computer may, e.g., be operated at room temperature (RT), i.e., above 273 K. For example, a classical computer is operated at 300 K. The control unit is configured for powering on specific loops of qubit control and read-out circuitry, i.e., individual control and read-out circuits of the control unit, which are active during an instruction cycle.

By selectively powering on individual control and read-out circuits of the control unit on demand, while ensuring that the remaining control and read-out circuits remain powered off, power saving may be achieved. The powering-on functionality for the individual control and read-out circuits may be implemented employing a rapid power on technique. Thus, low power and scalable quantum computing platforms may be provided. Depending on the number of qubits required for executing a given quantum calculation, a suitable number of control and read-out circuits of the control unit for controlling and reading out the required qubits may be powered on, while the remaining control and read-out circuits assigned to the remaining qubits are powered off.

Furthermore, reducing the power on time of the individual control and read-out circuits may allow to design the control unit with more relaxed electromigration (EM) constraints. For example, smaller devices and narrower metal interconnections may be allowed for reduced parasitic and hence power consumption, which otherwise, i.e., in case of longer power on times, would violate EM constraints.

The control unit provides an intelligent subsystem with signal processing capabilities, e.g., at close proximity to the qubits in case of a cryogenic control unit. A close proximity to the qubits may reduce latency. By using a control unit, the control unit may operate on a thermal scale at a temperature much closer to the temperature at which the qubits operate than the temperature at which the classical processor operates. This may allow to arrange the control unit in a closer proximity to the qubits. For future quantum computers with potentially millions of qubits operating at cryogenic temperature, such an intelligent subsystem with signal processing capabilities may be advantageous. The control unit schedules the data transfer between classical and the quantum processor. By selectively powering on control and read-out circuits, power efficiency may be improved. For example, a part of the electronic circuitry for controlling and reading out qubits, e.g., 90% and more, may be redundant during the execution of a quantum algorithm, which requires only a certain subset of qubits to be active during an instruction cycle. In order to control and read out the qubits of this subset, only a subset of the control and read-out circuits, i.e., control and read-out circuits assigned to the qubits of the subset of qubits, may be required for controlling and reading out the respective qubits. For example, only 10% or less of the control and read-out circuits may be required. Powering on only those control and read-out circuits assigned to active qubits, i.e., those qubits required for executing the quantum algorithm, while powering off the remaining control and read-out circuits, may offer an advantage in terms of power efficiency. Improving the power efficiency may in turn make room for scalability. The selective powering-on may be achieved by incorporating a powering-on capability in individual control and read-out blocks, such as digital-to-analog converters and analog-to-digital converters, of the control and read-out circuits of the control unit. Additionally, noise reduction, including supply noise, may be achieved by powering off circuits which are not operational during a given instruction cycle. Reducing noise may in turn increase coherence time of the qubits.

The lower thermal noise at lower temperatures favors a higher signal-to-noise ratio (SNR) at lower temperatures. The dependency of thermal noise on temperature T is proportional to $hf/[\exp(hf/k_B T)-1]$ with f denoting the frequency ($f=\omega/2\pi$), h denoting the Planck constant, and $k_B$ denoting the Boltzmann constant. Thus, the control and read-out circuits, e.g., in particular analog-to-digital-converters used for reading out the qubits, of the control unit may potentially have a higher SNR for a given sampling rate when compared control and read-out circuits, in particular analog-to-digital converters, operating at room temperature.

The elements comprised by the control unit and/or the control unit may be for reduced electromigration.

Control and read-out circuits, in particular analog-to-digital converters of the control and read-out circuits, may not be powered on and clocked, i.e., provided with a clock signal, continually. Only the selected subset of control and read-out circuits required for performing a specific task using only a selected subset of qubits may be powered on and clocked during a given instruction cycle. Thus, rather than powering on and clocking all control and read-out circuits continually and only triggering those control and read-out circuits required to be operational during a given instruction cycle, it is suggested to selectively power on and clock only those control and read-out circuits required, while the remaining control and read-out circuits remain powered off.

The control unit may, e.g., be configured for controlling and reading out qubits of an over a 1000 qubit machine with instructions being provided by classical electronics, operated, e.g., at RT.

For example, power supply to analog blocks of the control unit may be turned off as long as they are not needed in order to reduce power consumption.

Qubit platforms supported by the control unit may, e.g., be transmon qubits or spin qubits. A qubit frequency may, e.g., be in the range of 2 to 20 GHz.

For example, the cryogenic temperature, at which the control unit in form of a cryogenic control unit is operated, being a temperature within a temperature range of 1 K to 4 K. For example, the cryogenic temperature being a temperature of 3 K.

In case of future spin qubits operating at the temperature range of 1 K to 4 K, e.g., at 3 K, the control unit may be integrated with the quantum processor taking advantage of chip-to-chip interconnects.

For example, the plurality of control and read-out circuits comprises a number of control and read-out circuits equal to a number of qubits comprised by the plurality of qubits. Each of the control and read-out circuits of the plurality of control and read-out circuits is assigned to one of the qubits of the plurality of qubits.

For example, a ratio between control and read-out circuits of the control unit (Tx/Rx) to qubits may be in the range of 1:1. In case of a ratio of 1:1, the control unit comprises for qubit of the quantum processor an individual control and read-out circuit, which is assigned to the respective qubit and configured for individually controlling and reading out the respective qubit.

With 1:1 TX/Rx to qubit ratio, implementing a multiplexing method may be avoided. Such a multiplexing method may comprise a multiplexing (MUX) and demultiplexing (DEMUX) of signals. In such a case, a multiplexing/demultiplexing (MUX/DEMUX) logic, e.g., a CMOS MUX/DEMUX logic, implemented between the control unit and the quantum process. This may require the MUX logic to be implemented at an operational temperature below 1 K, e.g., at 100 mK. Avoiding multiplexing and thus avoiding a MUX/DEMUX logic, in particular a MUX/DEMUX logic implemented at an operational temperature below 1 K, may have the beneficial effect of reducing power consumption as well as improving noise immunity for the qubits and overall system complexity because of the omitted MUX/DEMUX control signals.

For example, the number of control and read-out circuits is smaller than the number of qubits. Each of the control and read-out circuits of the plurality of control and read-out circuits is assigned to more than one qubit of the plurality of qubits.

For example, a ratio between control and read-out circuits of the control unit (Tx/Rx) to qubits may be in the range of 1:2 to 1:150, e.g., 1:10. In case of a ratio of 1:10, the control unit comprises for each set of ten qubits one dedicated control and read-out circuits, which is assigned to the respective set of ten qubits and configured for controlling and reading out the ten qubits of the respective set. For example, the Tx/Rx to qubits ratio may be 1:2, 1:4, 1:8. 1:16, 1:32, 1:64 or 1:128 or preferably a ratio of $1:2^n$ with n being the number of controlled qubits per control and read-out circuit, to exploits the benefits of a binary scaling.

For example, multiplexing is used by each of the control and read-out circuits of the plurality of control and read-out circuits to be able to control and read out the more than one qubits of the plurality of qubits assigned to the respective control and read-out circuit in parallel.

For example, frequency multiplexing may be used for enabling and controlling of the qubits in parallel.

For example, each of the control and read-out circuits of the plurality of control and read-out circuits comprises a control digital-to-analog converter (DAC) configured for generating control pulses for controlling the qubits assigned to the respective control and read-out circuit. The respective control DAC may further be configured for generating read-out pulses for reading out the qubits assigned to the respective control and read-out circuit.

For example, the control DACs are configured for sending control pulses and read-out pulses of fixed frequencies.

For example, each of the control DACs comprises a memory for storing control patterns for controlling the qubits assigned to the control and read-out circuit comprising the respective control DAC. The memories of the control DACs may, e.g., be implemented in form of static random-access memory (SRAM).

For example, each of the control and read-out circuits of the plurality of control and read-out circuits comprising a bias DAC configured for providing one or more of the following for the qubits assigned to the respective control and read-out circuit: a direct current bias, a direct voltage bias. The bias DACs may, e.g., be a µDAC.

For example, each of the control and read-out circuits of the plurality of control and read-out circuits comprises an analog-to-digital converter (ADC) configured for receiving read-out data from the qubits assigned to the respective control and read-out circuit. The ADC may, e.g., be a time interleaved or single channel ADC.

The ADCs may be configured for waking up receiving an incoming signal, e.g., read-out data from the qubits.

For example, each of the ADCs comprises a memory for storing the read-out data from the qubits assigned to the control and read-out circuit comprising the respective ADC. The memories of the ADCs may, e.g., be implemented in form of SRAMs.

For example, each of the control and read-out circuits of the plurality of control and read-out circuits comprises a low noise amplifier (LNA) configured for amplifying signals comprising the read-out data from the qubits assigned to the respective control and read-out circuit for the analog-to-digital converter of the respective control and read-out circuit.

For example, the control unit comprises a transceiver configured for executing the receiving of the instructions from the classical processor and the transmitting of the data read out from the qubits to the classical processor.

For example, the transceiver is a gigabit transceiver, in particular a low power gigabit transceiver, that communicates with the classical computer comprising the classical process over a serial link, in particular a high-speed serial link. For example, the transceiver is configured for an optical communication with the classical computer.

For example, the control unit comprises a clock data recovery module configured for generating a reference clock signal for the plurality of control and read-out circuits. For example, the clock data recovery module provides a reference clock signal for the DACs and ADCs comprised by the control and read-out circuits of the control unit.

A clock signal generation capability at cryogenic temperature, in case of a cryogenic control unit, may reduce the number of coaxial cables, resulting in improved scalability. Furthermore, a reduction of cables may facilitate the cooling of the control unit.

For example, the control unit comprises a waveform pattern generator configured for generating the control patterns used by the control DACs for controlling the qubits. The pattern generator may be an arbitrary waveform pattern generator.

A control pattern generation capability at cryogenic temperature, in case of a cryogenic control unit, may reduce the number of coaxial cables, resulting in improved scalability. Furthermore, a reduction of cables may facilitate the cooling of the control unit.

For example, the control unit comprises a power-on sequence generator configured for generating a power-on sequence for powering on the control and read-out circuits of the subset of control and read-out circuits. For example, the power-on sequence comprises wake-up pulses sent to all the control and read-out circuits to be powered On. For example, the wake-up pulses are wake-up pulses for the control and bias DACs of the subset of control and read-out circuits. For example, the wake-up pulses may further comprise wake-up pulses for the DACs of the subset of control and read-out circuits.

A control signal, e.g., wake up pulse, generation capability at cryogenic temperature, in case of a cryogenic control unit, may reduce the number of coaxial cables, resulting in improved scalability. Furthermore, a reduction of cables may facilitate the cooling of the control unit.

For example, the control unit comprises a phase/amplitude shift calculator module for determining quantum mechanical states of the qubits, e.g., spin-states, using the data read out from the qubits.

For example, the control unit comprises a data packaging module configured for packaging the data read out from the qubits for the transmitting to the classical processor.

For example, the control unit may comprise a synchronizer module configured for synchronizing operations executed by the control unit.

For example, the control unit comprises a memory for storing the instructions received from the classical processor.

For example, the control unit comprises an instruction decoder configured for decoding the instructions received from the classical processor. The decoder receives and processes the instructions from the classical processor.

For example, the control unit comprises a quantum error correction module. The power saving achieved by the selective power on capability may open room additional for digital signal processing hardware, e.g., a quantum error correction (QEC) module. In case of a cryogenic control unit, this may facilitate a fast and efficient error correction, since a feedback loop used for quantum error correction which is implemented at a cryogenic temperature within the control unit may have a low latency, when compared to QEC hardware implemented at room temperature.

The QEC module may have the beneficial effect of implementing a protection of the quantum information handled by the qubits from errors, e.g., due to decoherence and other quantum noise. QEC may, e.g., be implemented using a bit flip code.

For example, closed loop control may be implemented by the control unit, i.e., at the cryogenic temperature, e.g., at 3 K, facilitating error correction.

The potential for increasing power efficiency based on a selective powering on of control and read-out circuits may be illustrated with the following exemplary, non-limiting calculation. The following power numbers are purely exemplary:

A 1024 qubit processor may be considered and a control unit implementing a 1:32 Tx/Rx to qubit ratio. This means, the control unit comprises one control and read-out circuit per 32 qubits. In case of 1024 qubits, the control unit comprises 32 control and read-out circuits. Each of these 32 control and read-out circuits is assigned a set of 32 qubits, which are controlled and read out by the respective control and read-out circuit. Multiplexing may be used to control 32 qubits by a single control and read-out circuit. Each of these control and read-out circuit may comprise a control DAC, a bias DAC and an ADC. Furthermore, the control unit may comprise a transceiver and quantum sequencer. The control unit may also comprise a digital signal processing block and a SERDES, i.e., a serializer/deserializer.

| Blocks in the proposed control unit | Estimated power consumption (digital and analog) | Number of units required with 1:32 DEMUX ratio |
|---|---|---|
| Gigabit transceiver | 500 mW | 1 |
| Quantum sequencer | 300 mW | 1 |
| Control DAC | 10 mW at 1 GHz | 32 |
| Bias DAC (µDAC) | 1 mW | 32 |
| ADC | 1 mW | 32 |
| Digital Signal Processing | 100 mW | 1 |
| SERDES | 50 mW | 1 |
| Total | 1.046 W | |

A selective power on capability for the control and read-out circuits, i.e., DACs and ADCs, is assumed. Furthermore, it may be assumed that 64 qubits, i.e., two MUX groups, are operational for a given instruction cycle. In other words, for executing a given quantum algorithm 64 qubits are required. With the selective power on capability, the number of control and read-out circuits that need to operate is reduced from 32 to 2.

Total power consumption without selective power on capability, i.e., powering on all 32 control and read-out circuits, is:

500 mW+300 mW+10 mW*32+1 mW*32+1 mW*32+100 mW+50 mW=1.334 W

The total power consumption of the 32 control and read-out circuits is:

10 mW*32+1 mW*32+1 mW*32=384 mW

Total power consumption with selective power on capability, i.e., powering on only two of the control and read-out circuits, is:

500 mW+300 mW+10 mW*2+1 mW*2+1 mW*2+100 mW+50 mW=974 W

The total power consumption of the two control and read-out circuits is:

10 mW*2+1 mW*2+1 mW*2=24 mW

This results in a power saving of (384 mW−24 mW)/384 mW=93.75% on the control and read-out circuits, excluding the common digital blocks of the control unit.

In a non-multiplexed system, with 1:1 ratio between the control and read-out circuits of the control unit and the qubits, the following power saving may be achievable:

Total power consumption without selective power on capability, i.e., powering on one control and read-out circuit for each of the 1024 qubits, is:

500 mW+300 mW+10 mW*1024+1 mW*1024+1 mW*1024+100 mW+50 mW=13.238 W

Total power consumption with selective power on capability, i.e., powering on one control and read-out circuit for each of the required 64 qubits, is:

500 mW+300 mW+10 mW*64+1 mW*64+1 mW*64+100 mW+50 mW=1.718 W

This results in a power saving of (13.238 W−1.718 W)/13.238 W=87% for all blocks of the control unit.

Another example for illustrating the potential for increasing power efficiency may be the following: A 30 ns instruction cycle, an output data rate of 1 GHz for a 1024 qubit quantum system is assumed with a 1:16 Tx/Rx to qubit ratio. This means, the control unit comprises one control and read-out circuit per 16 qubits. Further, it may be assumed that 64 qubits are required to operate simultaneously in 4 multiplexed channels.

Without selective power on capability for individual control and read-out circuits, the control and read-out circuits for all 1024 qubits systems are powered on. Each of the control and read-out circuits may, e.g., comprise a drive and read-out Tx/Rx. In addition, power may be required for gate pulsing and a digital block. The individual power consumption may be as follows: drive (5.2 mW/qubit), read-out Tx/Rx (1.3/9.3 mW/qubit), gate pulsing (2.9 mW/channel), and digital block (140 mW at 1.6 GHz). The resulting total power consumption is:

5.2 mW*1024+10.6 mW*1024+2.9 mW*4+140 mW=16.43 W

With selective power on capability for individual control and read-out circuits, only the control and read-out circuits assigned to the 64 qubits of the 1024 actually required are powered on. Taking into account only the per qubit power consumption of the components only for the 64 operational qubits, the resulting total power consumption is:

5.2 mW*64+10.6 mW*64+2.9 mW*4+140 mW=1.16 W

This results in a power saving of (16.43 W−1.16 W)/16.43 W=92.93%.

The aforementioned numbers are provided for purely illustrative purposes of the power saving potential of control unit as described herein.

In FIG. 1 an exemplary hardware architecture of a computational system 210 comprising a control unit 100 operated at a cryogenic temperature, i.e., a cryogenic control unit. Furthermore, the computational system 210 comprises a quantum processor 160 and a classical computer 212 with a classical processor. The quantum processor 160 is operated at low cryogenic temperatures, like e.g., 10 mK. The classical computer 212 on the other hand operates, e.g., at room temperature. For example, the classical computer 212 is operated at 300 K.

The control unit 100 controls data transfer between the classical computer 212, i.e., the classical processor of the classical computer 212, and the quantum processor 160, which comprises a plurality of qubits. Thereby, the control unit 100 provides an intelligent subsystem with signal processing capabilities in close proximity to the qubits of the quantum processor 160. This close proximity to the qubits may reduce latency. The control unit 100 schedules the data transfer between classical processor of the classical computer 212 and the quantum processor 160. The control unit 100 is operated at a cryogenic temperature, e.g., at a temperature within the range of 1 K to 4 K. For example, the control unit 100 is operated at 3 K.

Communication between the classical computer 212 and the control unit 100 is implemented in digital form via digital I/O 156. The control unit 100 communicates with the quantum processor 160 using analog signals transferred via superconducting interconnects 166, which are thermally isolated. In general, control lines may be dissipative and read-out lines may be superconducting. Thus, the control unit 100 may provide a bridge between the digital and analog data processing.

From the classical computer 212, the control unit 100 receives instructions in form of digital signals. The instructions are processed by the control unit 100, which selectively powers on control and read-out circuits to control and read out qubits of the quantum processor 160 in order to execute the instructions, while making sure that the remaining control and read-out circuits are powered off during the instruction cycle. The control and read-out circuits comprise DACs to convert digital signals to analog signals, which are sent to the quantum processor 160 in order to control the qubits. Furthermore, the control and read-out circuits comprise ACDs to convert analog read-out signals from the qubits comprising the read-out data into digital signals, which are processed by the control unit 100. The resulting digital data, i.e., the analog to digital converted read-out data is transferred to the classical computer 212.

By selectively powering on control and read-out circuits, power efficiency may be improved. For example, a part of the electronic circuitry for controlling and reading out qubits, e.g., 90% and more, may be redundant during the execution of a quantum algorithm, which requires only a certain subset of qubits to be active during an instruction cycle. In order to control and read out the qubits of this subset, only a subset of the control and read-out circuits, i.e., control and read-out circuits assigned to the qubits of the subset of qubits, may be required for controlling and reading out the respective qubits. For example, only 10% or less of the control and read-out circuits may be required. Powering on only those control and read-out circuits assigned to active qubits, i.e., those qubits required for executing the quantum algorithm, while powering off the remaining control and read-out circuits, may offer an advantage in terms of power efficiency. Improving the power efficiency may in turn make room for scalability. The selective powering-on may be achieved by incorporating a powering-on capability in individual control and read-out blocks, such as digital-to-analog converters and digital-to-analog-to-digital converters, of the control and read-out circuits of the control unit 100.

Additionally, noise may be reduced may by powering off circuits which are not operational during a given instruction cycle. Such a reduction of noise may in turn increase coherence time of the qubits. Furthermore, thermal noise is lower at lower temperatures. Thus, at lower temperatures a higher signal-to-noise ratio (SNR) is achievable. The control and read-out circuits, e.g., the analog-to-digital-converters used for reading out the qubits, of the control unit 100 operated at a cryogenic temperature may achieve a higher SNR for a given sampling rate when compared control and read-out circuits operated at room temperature.

Figure 2:
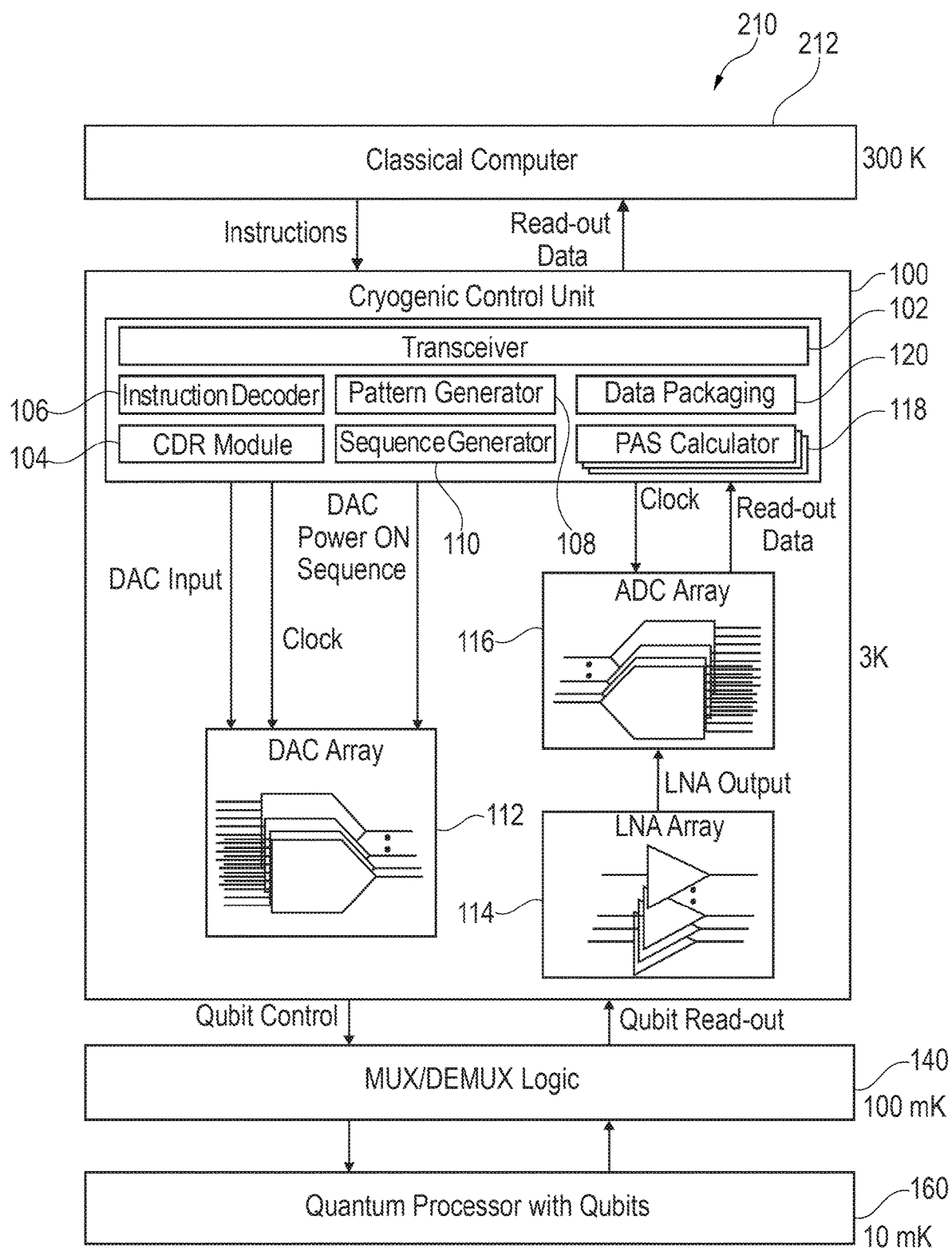
FIG. 2 depicts a schematic diagram illustrating an exemplary computational system comprising a control unit using multiplexing to communicate with the qubits.

In FIG. 2 an exemplary computational system 210 comprising a control unit 100 is shown. The computational system 210 further comprises a classical computer 212 as well as a quantum processor 160 with a plurality of qubits. The classical computer is operated at room temperature, e.g., 300 K, while the quantum processor 160 is operated at low cryogenic temperatures, e.g., 10 mK. The control unit 100 is operated at cryogenic temperatures as well. For example, control unit 100 is operated at a cryogenic temperature of 1 K to 4 K, e.g., at 3 K.

The control unit 100 controls data transfer between the classical computer 212 and the quantum processor 160. It provides an intelligent subsystem with signal processing capabilities in close proximity to the qubits of the quantum processor 160. For this purpose, the control unit 100 comprises a transceiver 102, a clock data recovery (CDR) module 104, an instruction decoder 106, a waveform pattern generator 108, a power-on sequence generator 110, phase/amplitude shift calculators 118 and a data packaging module 120. Furthermore, the control unit 100 comprises a plurality of control and read-out circuits for controlling the qubits of the quantum processor 160 as well as to read out the qubits. The control and read-out circuits may, e.g., comprise an array of DACs 112 for controlling the qubits as well as an array of ADCs 116 for reading out the qubits. The array of DACs comprises a plurality of DACs 112. The array of ADCs comprises a plurality of ADCs 112. Furthermore, the control and read-out circuits may, e.g., comprise an array of low noise amplifiers (LNAs) 114 for amplifying read-out signals received from the qubits. The array of LNAs comprises a plurality of LNAs 114.

To each of the control and read-out circuits may, e.g., one or more DACs 112 of the array of DACs may be assigned. For example, to each of the control and read-out circuits a control DAC as well as a bias DAC may be assigned. Furthermore, to each of the control and read-out circuits may, e.g., an ADC 116 of the array of ADCs as well as an LNA 114 of the array of LNAs may be assigned. Each of the control and read-out circuits may be configured for controlling one or more of the qubits of the quantum processor 160.

In case of the embodiment shown in FIG. 2, the number of control and read-out circuits is smaller than the number of qubits of the quantum processor 116. Thus, each of the control and read-out circuits of the control unit 100 is assigned to more than one qubit of the quantum processor 116. Each of the control and read-out circuits may be configured for controlling and reading out more than one qubit. For example, the ratio between control and read-out circuits and qubits, i.e., the Tx/Rx to qubits ratio, may be 1:2, 1:4, 1:8. 1:16, 1:32, 1:64 or 1:128, i.e., each of the control and read-out circuits may be configured for controlling and reading out 2, 4, 8, 16, 32, 64, or 128 qubits, respectively. To enable each of the control and read-out circuits to control and read out more than one qubit in parallel, multiplexing may be used. For this purpose, the computational system 210 comprises a multiplexer/demultiplexer (MUX/DEMUX) logic 140 arranged between the control unit and the quantum processor 160. The MUX/DEMUX logic 140 may, e.g., implement a frequency multiplexing enabling a controlling and reading out of multiple qubits in parallel. The MUX/DEMUX logic 140 may be operated at a cryogenic temperature between the cryogenic operating temperature of the control unit 100 and the cryogenic operating temperature of quantum processor 160. For example, the MUX/DEMUX logic 140 is operated at a temperature below 1 K, e.g., at a temperature of 50 mK to 900 mK. For example, the MUX/DEMUX logic 140 is operated at 100 mK. The MUX/DEMUX logic 140 may, e.g., be a CMOS logic.

The transceiver 102 of the control unit 100 may be a gigabit transceiver, e.g., a low power gigabit transceiver. For example, the transceiver 102 may be configured for communicating optically, i.e., via an optical data connection, with the classic computer 212. The transceiver 102 may communicate with the classic computer 212, e.g., via a high-speed serial link. For example, the transceiver 102 may communicate with the classic computer 212 via an optical serial link. Using the transceiver 100, the control unit 100 may receive instructions from the classical computer 212. Furthermore, the control unit 100 may send read-out data read out from the qubits to the classical computer 212 using the transceiver 102.

The clock data recovery (CDR) module 104 may be configured for generating a reference clock signal for the control and read-out circuits of the control unit 100, e.g., for the DACs 112 and ADCs 116 of the control and read-out circuits. Generating the reference clock signal within the intelligent subsystem, i.e., control unit 100, may have the beneficial effect of reducing the number of cables required for data transfer between the classical computer 212 and the control unit 100.

The instruction decoder 106 may be configured for decoding instructions received by the control unit 100 from the classical computer 212 using the transceiver 102. The decoded instructions are provided to the waveform pattern generator 108 and the power-on sequence generator 110. The power-on sequence generator 110 may be configured for generating a power-on sequence, i.e., wake-up pulses, to selectively power on those control and read-out circuits required to control and read out those qubits necessary to execute the received instructions. For example, power-on sequence generated by the sequence generator 110 may be configured for powering on those DACs 112, i.e., control DACs and bias DACs, of the array of DACs required to control and read out those qubits of the quantum processor 160 necessary to execute the received instructions. The waveform pattern generator 108 may be configured for generating input patterns for the powered-on control and read-out circuits which are used by the powered-on control and read-out circuits, e.g., the control DACs of the powered-on control and read-out circuits, to control and read out qubits of the quantum processor 160. The DACs 112 may comprise memories, e.g., SRAMs, to store the input pattern received from the waveform pattern generator 108.

Qubit control pulses as well as qubit read-out pulses may be sent by the selectively powered-on control and read-out circuits of the control unit 100 to selected qubits assigned to the respective control and read-out circuits. More precisely, the qubit control and qubit read-out pulses may be sent by the control DACs of the respective control and read-out circuits. For example, the same control DACs which are used to control the qubits may be used to generate read-out pulses to initiate the process. The pulses may be sent via the MUX/DEMUX logic 140 to the quantum processor 160. The MUX/DEMUX logic 140 may multiplex the pulses, e.g., a frequency multiplexing may be implemented by the MUX/DEMUX logic 140 enabling a controlling and reading out of multiple qubits of the quantum processor in parallel.

When read-out pulses are received by the qubits of the quantum processor 160, the qubits in response send read-out data via the MUX/DEMUX logic 140 to the assigned powered-on control and read-out circuits of the control unit 100. The read-out data read out from the qubits may be demultiplexed by the MUX/DEMUX logic 140, amplified by the LNAs 114 of the powered-on control and read-out circuits and provided to the ADCs 116 of the powered-on control and read-out circuits. The ADCs 116 may, e.g., wake up in response to the incoming data, i.e., the demultiplexed read-out data. The analog read-out signals comprising the read-out data from the qubits are converted into digital read-out signals by the ADCs 116. The digital read-out signals are forwarded to the phase/amplitude shift calculators 118. For example, the control unit 100 may comprise one phase/amplitude shift calculator 118 per ADC 116 of the array of ADCs, i.e., the control unit 100 may comprise an array of phase/amplitude shift calculators 118. A phase/amplitude shift calculator 118 is a digital signal processor, which may be configured for determining the quantum mechanical states of the read-out qubits, e.g., their spin-state, using the data read out from the respective qubits. The digital data comprising the result of the determination of the qubit states executed by the phase/amplitude shift calculator 118, i.e., read-out data, is forwarded to the data packaging module 120. The data packaging module 120 is configured for packaging the data provided by the phase/amplitude shift calculator 118, i.e., the read-out data from the qubits, for the transmitting to the classical computer system 212. The data packages with the read-out data generated by the data packaging module 120 are sent by the control unit 100 to the classical computer 212 using the transceiver 102.

Figure 3:
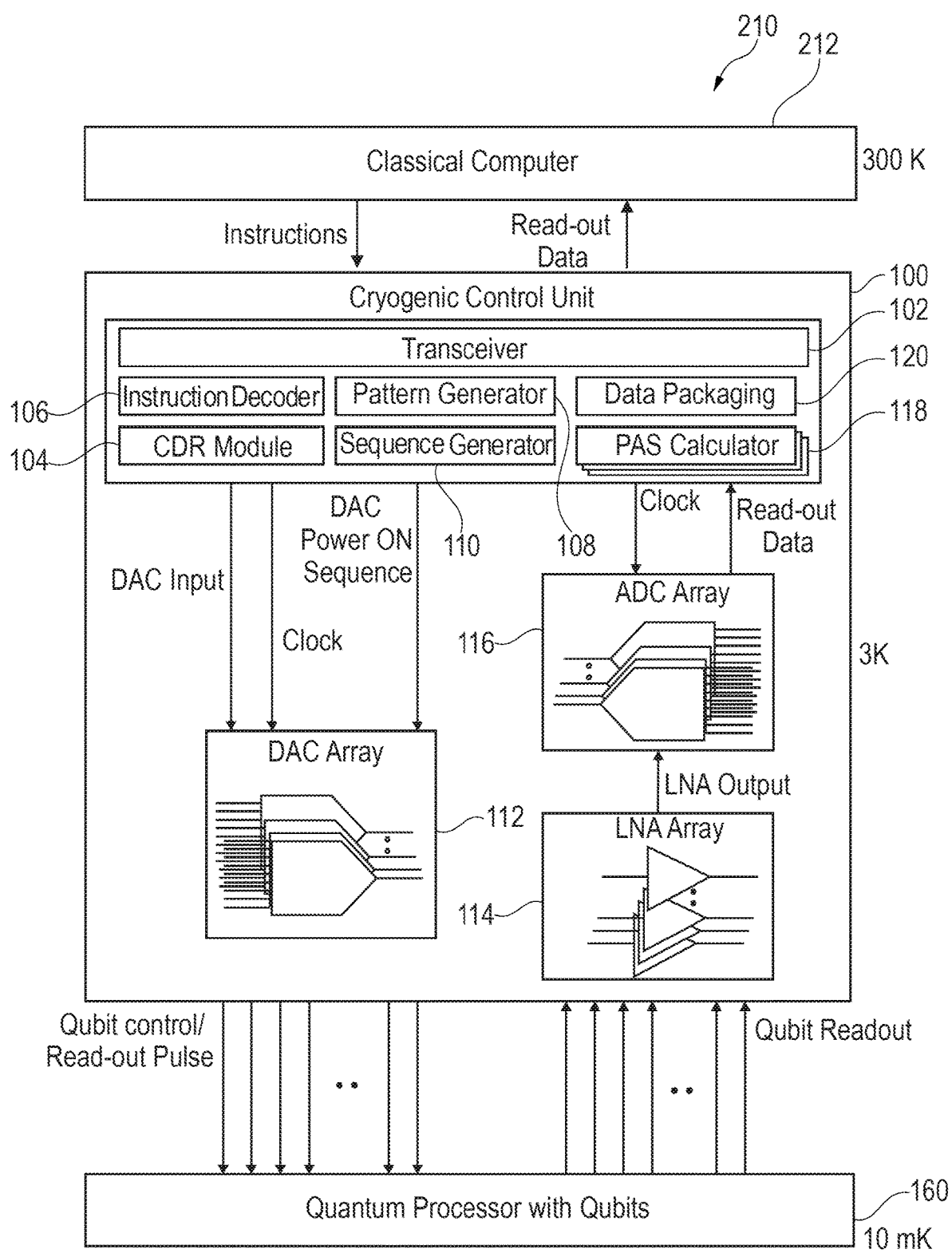
FIG. 3 depicts a schematic diagram illustrating an exemplary computational system comprising a control unit with a dedicated control and read-out circuit for each of the qubits.

In FIG. 3 an exemplary computational system 210 comprising a control unit 100 is shown. The computational system 210 depicted in FIG. 3 corresponds to the computational system 210 shown in FIG. 2. The computational system 210 of FIG. 3 difference from the computational system 210 of FIG. 2 in that the number of control and read-out circuits of the control unit 100 equals the number of qubits of the quantum processor 160. Thus, in case of FIG. 3 the Tx/Rx to qubit ratio is 1:1. Each of the control and read-out circuits is assigned to an individual qubit, which is controlled and read out by the assigned control and read-out circuit. With a Tx/Rx to qubit ratio of 1:1 a MUX/DEMUX logic, e.g., at the mK scale, may be avoided. Avoiding the MUX/DEMUX logic may result in a reduction of the power consumption. Furthermore, the avoiding the MUX/DEMUX logic may increases the noise immunity for the qubits of the quantum processor 160.

Figure 4:
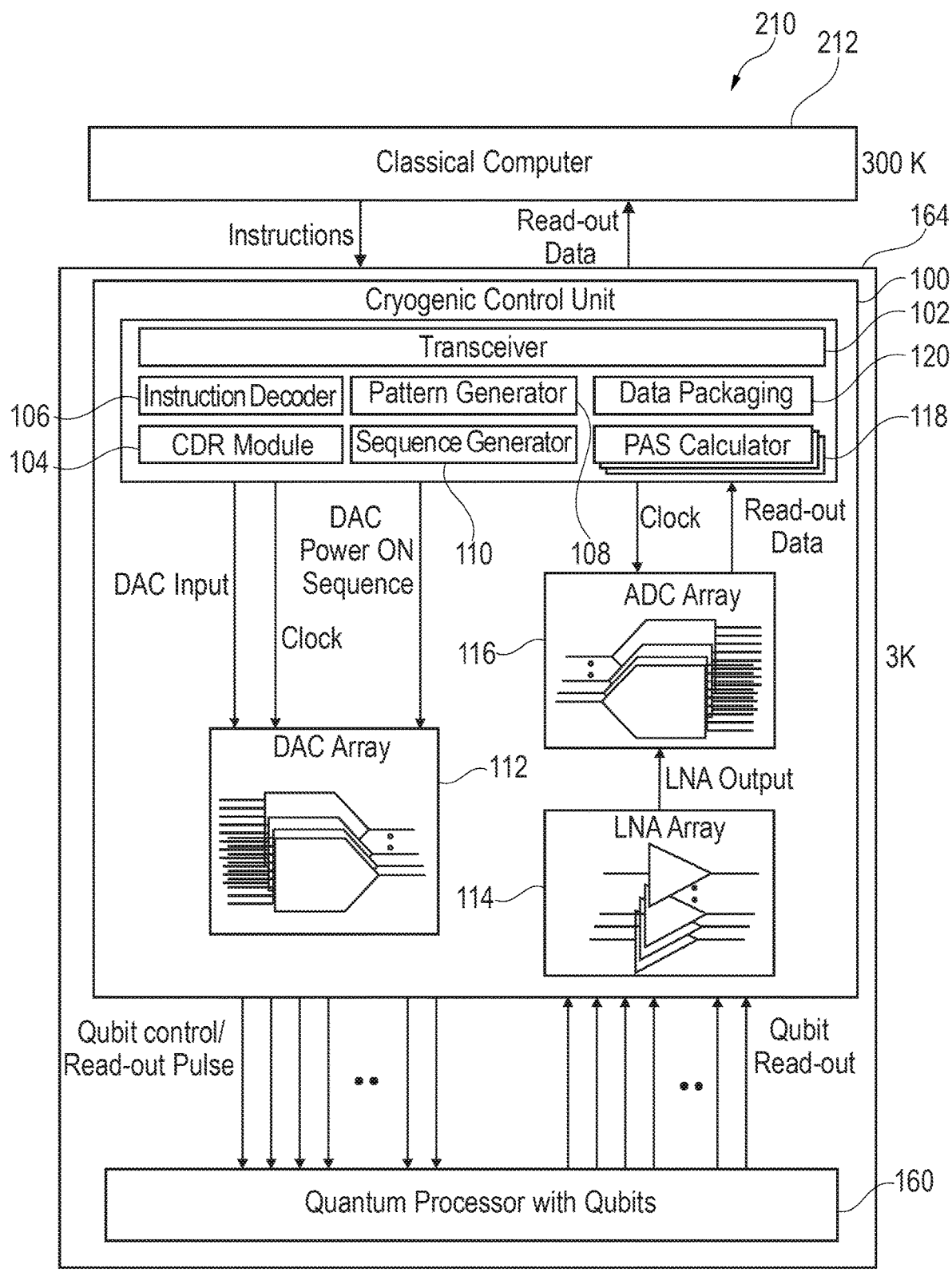
FIG. 4 depicts a schematic diagram illustrating an exemplary computational system comprising a control unit with a quantum processor on the same elevated temperature as the control unit.

In FIG. 4 an exemplary computational system 210 comprising a control unit 100 is shown. The computational system 210 depicted in FIG. 4 corresponds to the computational system 210 shown in FIG. 3. The computational system 210 of FIG. 4 differentiates from the computational system 210 of FIG. 4 in that the quantum processor 160 is operated at the same cryogenic temperature as the control unit 100. A quantum computer 164 may be implemented as comprising the quantum processor 160 as well as the control unit 100. For example, the quantum processor 160 and the control unit 100 may be cooled by the same cryostat. For example, the quantum processor 160 and the control unit 100 may both be operated 1 K to 4 K, e.g., at 3 K. For example, spin qubits operating at the temperature range of 1 K to 4 K, e.g., at 3 K, may be used. Thus, the control unit 100 may be integrated with the quantum processor 160, e.g., taking advantage of chip-to-chip interconnects.

Figure 5:
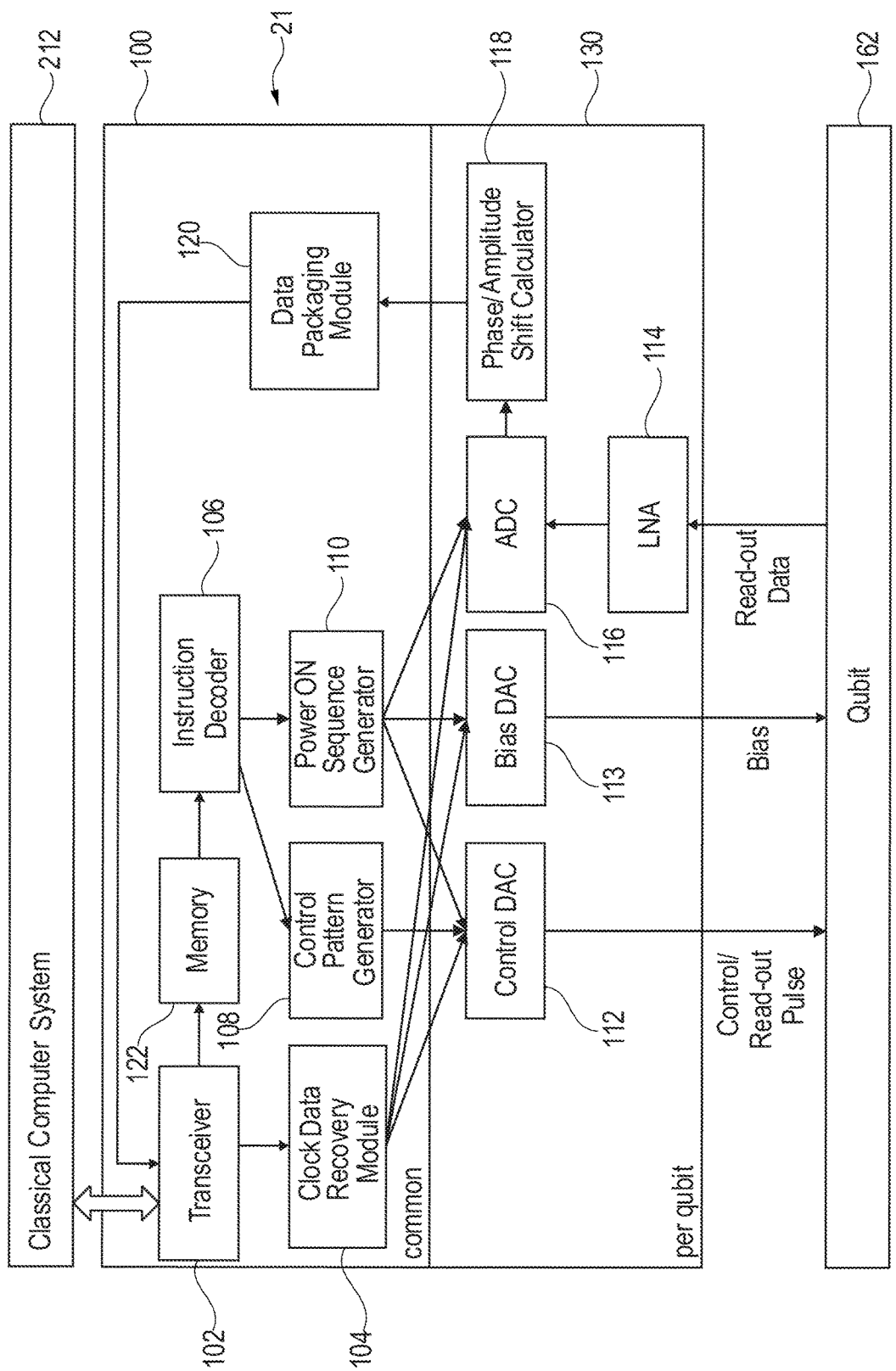
FIG. 5 depicts a block diagram illustrating an exemplary computational system reflecting building blocks and connections of the setups of FIG. 3 and FIG. 4.

In FIG. 5 an exemplary computational system 210 comprising a control unit 100 is shown. The control unit 100 coordinating control and read-out operations to control and read out the qubits of the quantum processor 160 may, e.g., be implemented as a SoC. It may provide an intelligent subsystem with signal processing capabilities in close proximity to the qubits 162 of the quantum processor. This subsystem may comprise elements which are common to all the qubits 162 as well as elements which are assigned to individual qubits. For example, the control unit 100 may comprise a control and read-out circuit 130 for each of the qubits 162.

For example, the common elements comprise a control transceiver 102, a memory 122, a clock data recovery (CDR) module 104, an instruction decoder 106, a waveform pattern generator 108, a power-on sequence generator 110, and a data packaging module 120. The per-qubits-elements may be provided by the control and read-out circuits 130 of the control unit 100 configured for controlling the qubits 162 as well as to read out the qubits 162. The control unit 100 comprise one control and read-out circuit 130 per qubit 162, i.e., the Tx/Rx to qubit ratio may be 1:1. Each of the control and read-out circuits 130 may, e.g., comprise a control DAC 112 for controlling one of the qubits 162 assigned to the respective control and read-out circuit 130 as well as a bias DAC 113 for providing a DC bias and/or a direct voltage bias for the qubit 162 assigned to the respective control and read-out circuit 130. Furthermore, each of the control and read-out circuits 130 may, e.g., comprise an LNA for amplifying read-out signals received from the qubit 162 assigned to the respective control and read-out circuit 130, and an ADC 116 for converting the amplified analog signal in a digital signal. Finally, the control and read-out circuit 130 may comprise a phase/amplitude shift calculator 118 for determining a quantum mechanical state of the qubit 162 assigned to the respective control and read-out circuit 130 using the digital signal provided by the ADC 116.

The transceiver 102 may be a gigabit transceiver, e.g., a low power gigabit transceiver. For example, the transceiver 102 may be configured for communicating optically, i.e., via an optical data connection, with the classic computer 212. The transceiver 102 may communicate with the classic computer 212, e.g., via a high-speed serial link. For example, the transceiver 102 may communicate with the classic computer 212 via an optical serial link. The control unit 100, via the transceiver 100, may receive instructions from the classical computer 212. The instructions received from the classic computer 212 may be stored in the memory 122.

The clock data recovery (CDR) module 104 may be configured for generating a reference clock signal for the control and read-out circuits 130. For example, the reference clock signal may be sent to the control DAC 112, the bias DAC 113 and ADC 116 of each powered-on control and read-out circuit 130 of the control unit 100. Generating the reference clock signal within the intelligent subsystem, i.e., control unit 100, may have the beneficial effect of reducing the number of cables required for data transfer between the classical computer 212 and the control unit 100.

From the memory, the instructions may be forwarded to the instruction decoder 106. The instruction decoder 106 may be configured for decoding instructions. The decoded instructions are provided to the waveform pattern generator 108 and the power-on sequence generator 110. The power-on sequence generator 110 may be configured for generating a power-on sequence, i.e., wake-up pulses, to selectively power on those control and read-out circuits 130 required to control and read out those qubits 192 necessary to execute the received instructions. The power-on sequence is configured for powering on the control DAC 112 and bias DAC 113 of each of the control and read-out circuits 130 to be powered on. For example, a wake-up pulse is sent to each of these control DACs 112 and bias DACs 113. In addition, the power-on sequence may be configured for powering on the ADC 116 of each of the control and read-out circuits 130 to be powered on. For example, a wake-up pulse is sent to each of these ADCs 116. Thus, a selective powering-on of individual control and read-out circuits 130 may be performed and implemented. The waveform pattern generator 108 may be configured for generating input patterns for the powered-on control and read-out circuits 130. An input pattern may be sent to each of the powered-on control and read-out circuit 130, i.e., to the control DAC 112 of the respective control and read-out circuit 130. The input pattern may be used by the control DAC 112 to control and read out the qubit 162 assigned to the control and read-out circuit 130 comprising the respective control DAC 112. The control DAC 112 may comprise a memory, e.g., an SRAM, to store the respective input pattern. The input pattern may be used by the control DAC 112 to generate control and read-out pulses, which are sent to the qubit 162 assigned to the respective control and read-out circuit 130 in order to control and read out this respective qubit 162, respectively. The bias DAC 116 may be configured for providing a DC bias and/or direct voltage bias to the qubit 162 assigned to the respective control and read-out circuit 130.

The qubit 162 of the quantum processor may, in response to the control and read-out pulses, provide read-out data to the control and read-out circuit 130, to which the respective qubit 162 is assigned. The read-out data may be provided to the ADC of the respective control and read-out circuit 130 via an LNA 114. The LNA 114 may amplify the read-out signal received from the respective qubit 162. The ADC 116 may, e.g., wake up in response to the incoming data, i.e., the read-out data. The analog read-out signals comprising the read-out data from the qubit 162 is converted into a digital read-out signal by the ADC 116. The digital read-out signal is forwarded to the phase/amplitude shift calculator 118 of the respective control and read-out circuit. The phase/amplitude shift calculator 118 is a digital signal processor, which may be configured for determining the quantum mechanical states, e.g., spin state, of the read-out qubit 162 using the data read out from the respective qubit 162. The digital signal comprising the result of the determination of the qubit states executed by the phase/amplitude shift calculator 118 is forwarded to the data packaging module 120. The data packaging module 120 is configured for packaging read-out data provided by the control and read-out circuits 130 of the control unit 100, i.e., the phase/amplitude shift calculators 118, into data package for the transmitting to the classical computer system 212. The data packages with the read-out data generated by the data packaging module 120 are sent to the classical computer 212 via the transceiver 102.

Figure 6:
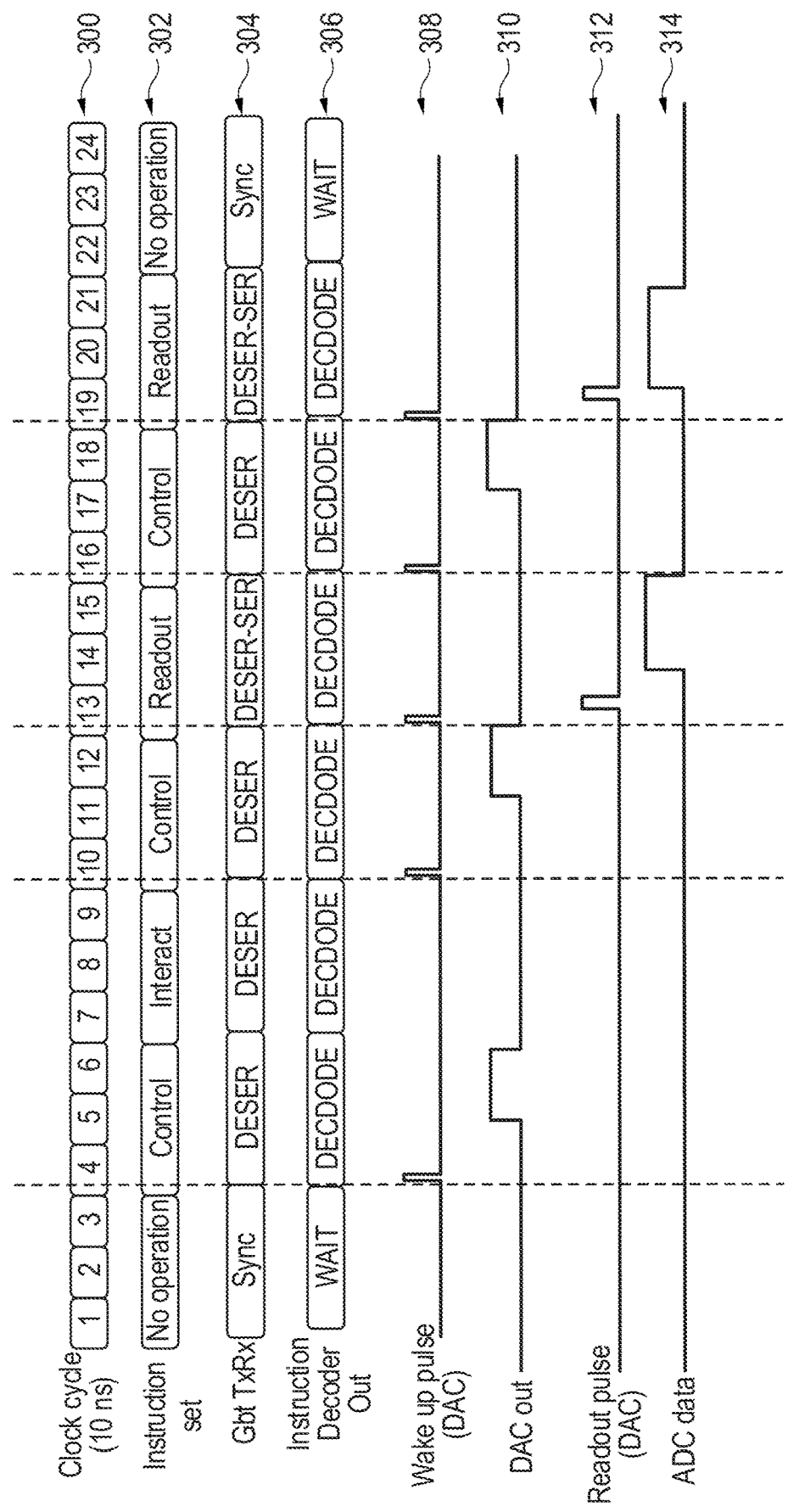
FIG. 6 depicts exemplary waveforms for controlling and reading out qubits using a control unit.

In FIG. 6 exemplary waveforms for controlling and reading out qubits using a control unit are illustrated. In the first line 300, clock cycles of a system clock, e.g., of 10 ns, are shown. In the second line 302, instruction sets provided by the classical computer for the control unit are shown. These instruction sets, e.g., comprise "No operation", "Control", "Interact"; and "Read out". In the third line 304, operations of the gigabit transceiver (Gbt TxRx) are shown. These operations, e.g., comprise synchronizing "Sync", deserializing "DESER", and deserializing-serializing "DESER-SER". In the fourth line 306, the instruction decoder output is shown. The instruction decoder output, e.g., comprises "WAIT" and "DECODE". In the fifth line 308, wake up pulses are sent to a DAC to selectively power on this DAC. In the sixth line 310, DAC output, i.e., control pulses, sent by the powered-on DAC are shown. In the seventh line 312, read-out pulses sent by the powered-on DAC are shown. Finally, in the eighth line 314, read-out signals received by an ADC in response to the read-out pulses sent before are shown.

Figure 7:
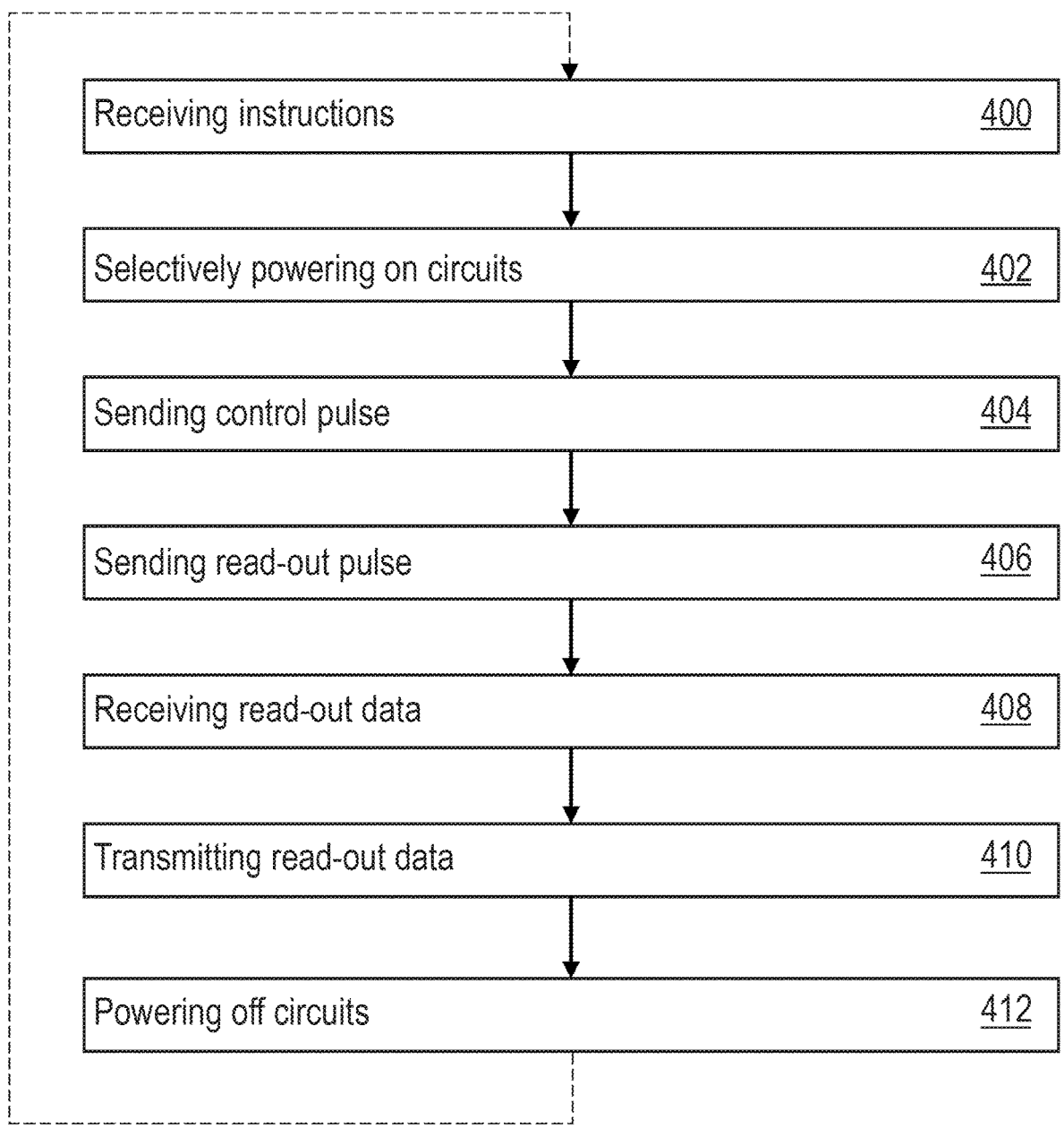
FIG. 7 depicts a flow diagram illustrating an exemplary method for operating a control unit.

FIG. 7 illustrates an exemplary method for operating a control unit. In block 400, the control unit receives instructions from a classical computer. In block 402, the control unit selectively powers on control and read-out circuits required control and read out qubits necessary to execute the instructions received in block 400. In block 404, the powered-on control and read-out circuits, e.g., control DACs of these circuits, sent control pulses to the qubits assigned to the powered-on control and read-out circuits to control the same. These control pulses, e.g., depend on input patterns generated using the received instructions and provided to the DACs. In block 406, read-out pulses are sent to the qubits by the powered-on control and read-out circuits, e.g., control DACs of these circuits, in order to read out the qubits. In block 408, read-out data is received by the powered-on control and read-out circuits, e.g., control ADCs of these circuits. In block 410, theses read-out data is transmitted by the control unit to the classical computer. In block 412, the selectively powered on control and read-out circuits are powered off again. The method comprising blocks 400 to 412, may be used for operating the control unit during a single instruction cycle. For a following instruction cycle, the method may be repeated as indicated by the dashed arrow in FIG. 7.

Figure 8:
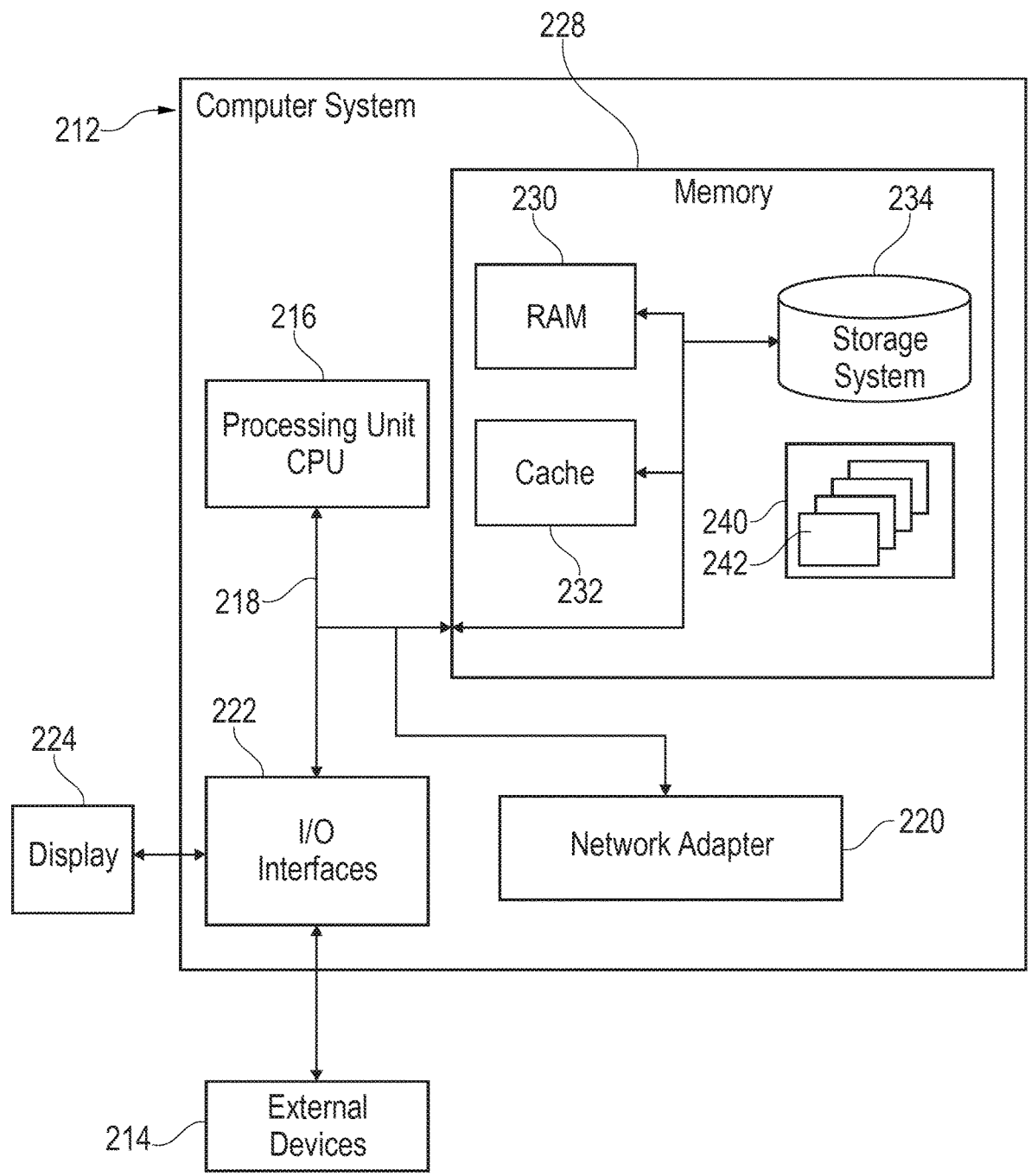
FIG. 8 depicts a block diagram illustrating an exemplary classical computer system.

In FIG. 8 a block diagram of a classical computer system 212. Computer system 212 is only one example of a suitable classical computer system and is not intended to suggest any limitation as to the scope of use or functionality of embodiments of the invention described herein. Regardless, the computer system 212 is capable of being implemented and/or performing any of the functionality in relation with the control unit set forth herein and above.

Computer system 212 is operational with numerous other general-purpose or special-purpose computing system environments or configurations. Examples of well-known computing systems, environments, and/or configurations that may be suitable for use with computer system 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 212 in data processing system 210 is shown in the form of a general-purpose computing device. The components of computer system 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 212 typically includes a variety of computer system readable media. Such media may be any available media that is accessible by computer system 212, and it includes both volatile and non-volatile media, removable and non-removable media.

System memory 228 can include computer system readable media in the form of volatile memory, such as random-access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured for carrying out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. The program module 242 may, e.g., generate instructions for a control unit, which are sent to the control unit via one of the I/O interfaces 222, e.g., an optical serial link. Furthermore, the program module 242 may be configured for processing read-out data from qubits controlled and read out by the control unit, which the is received from the control unit in response to sending the instructions.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. The I/O interfaces 222 may comprise an I/O interface, e.g., an optical serial link for communicating with a control unit. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc. The external devices 214 may, e.g., comprise a control unit as described herein. The classical computer system 212 may communicate with this control unit via one or more of the I/O interfaces 222, e.g., an optical serial link. The classical computer system 212 may send instructions to the control unit and receive read-out data from qubits controlled and read out by the control unit in response to sending the instructions.

Possible combinations of features described above can be the following:

Combination 1: A control unit for controlling a data transfer between a classical processor and a quantum processor with a plurality of qubits,
the control unit comprising a plurality of control and read-out circuits configured for controlling and reading out the plurality of qubits, each of the control and read-out circuits of the plurality of control and read-out circuits being assigned to one or more of the qubits of the plurality of qubits,
the control unit being configured for:
receiving instructions from the classical processor,
controlling the quantum processor in order to execute the instructions,
the controlling of the quantum processor comprising selectively powering on a subset of control and read-out circuits of the plurality of control and read-out circuits during an instruction cycle, while ensuring that the remaining control and read-out circuits of the plurality of control and read-out circuits are powered off during the instruction cycle, the subset of control and read-out circuits comprising less control and read-out circuits than the plurality of control and read-out circuits,
using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned,
transmitting the data read out from the qubits to the classical processor.

Combination 2: The control unit of combination 1, the control unit being a cryogenic control unit operated at a cryogenic temperature.

Combination 3: The cryogenic control unit of combination 2, the cryogenic temperature, at which the cryogenic control unit is operated, being a temperature within a temperature range of 1 K to 4 K.

Combination 4: The control unit of any of combinations 1 to 3, the plurality of control and read-out circuits comprising a number of control and read-out circuits equal to a number of qubits comprised by the plurality of qubits with each of the control and read-out circuits of the plurality of control and read-out circuits being assigned to one of the qubits of the plurality of qubits.

Combination 5: The control unit of any of combinations 1 to 4, the number of control and read-out circuits being smaller than the number of qubits with each of the control and read-out circuits of the plurality of control and read-out circuits being assigned to more than one qubit of the plurality of qubits.

Combination 6: The control unit of combination 5, with multiplexing being used by each of the control and read-out circuits of the plurality of control and read-out circuits to be able to control and read out the more than one qubits of the plurality of qubits assigned to the respective control and read-out circuit in parallel.

Combination 7: The control unit of any of combinations 1 to 6, each of the control and read-out circuits of the plurality of control and read-out circuits comprising a control digital-to-analog converter configured for generating control pulses for controlling the qubits assigned to the respective control and read-out circuit, the control digital-to-analog converter further being configured for generating read-out pulses for reading out the qubits assigned to the respective control and read-out circuit.

Combination 8: The control unit of combination 7, each of the control digital-to-analog converters comprising a memory for storing control patterns for controlling the qubits assigned to the control and read-out circuit comprising the respective control digital-to-analog converter.

Combination 9: The control unit of any of combinations 1 to 8, each of the control and read-out circuits of the plurality of control and read-out circuits comprising a bias digital-to-analog converter configured for providing one or more of the following for the qubits assigned to the respective control and read-out circuit: a direct current bias, a direct voltage bias.

Combination 10: The control unit of any of combinations 1 to 9, each of the control and read-out circuits of the plurality of control and read-out circuits comprising an analog-to-digital converter configured for receiving read-out data from the qubits assigned to the respective control and read-out circuit.

Combination 11: The control unit of any of combinations 1 to 10, each of the control and read-out circuits of the plurality of control and read-out circuits comprising a low noise amplifier configured for amplifying signals comprising the read-out data from the qubits assigned to the respective control and read-out circuit for the analog-to-digital converter of the respective control and read-out circuit.

Combination 12: The control unit of any of combinations 1 to 11, the control unit comprising a transceiver configured for executing the receiving of the instructions from the classical processor and the transmitting of the data read out from the qubits to the classical processor.

Combination 13: The control unit of any of combinations 1 to 12, the control unit comprising a clock data recovery module configured for generating a reference clock signal for the plurality of control and read-out circuits.

Combination 14: The control unit of any of combinations 1 to 13, the control unit comprising a waveform pattern generator configured for generating the control patterns used by the control digital-to-analog converters for controlling the qubits.

Combination 15: The control unit of any of combinations 1 to 14, the control unit comprising a power-on sequence generator configured for generating a power-on sequence for powering on the control and read-out circuits of the subset of control and read-out circuits.

Combination 16: The control unit of any of combinations 1 to 15, the control unit comprising a phase/amplitude shift calculator module for determining quantum mechanical states of the qubits using the data read out from the qubits.

Combination 17: The control unit of any of combinations 1 to 16, the control unit comprising a data packaging module configured for packaging the data read out from the qubits for the transmitting to the classical processor.

Combination 18: The control unit of any of combinations 1 to 17, the control unit comprising a synchronizer module configured for synchronizing operations executed by the control unit.

Combination 19: The control unit of any of combinations 1 to 18, the control unit comprising a memory for storing the instructions received from the classical processor.

Combination 20: The control unit of any of combinations 1 to 19, the control unit comprising an instruction decoder configured for decoding the instructions received from the classical processor.

Combination 21: The control unit of any of combinations 1 to 20, the control unit comprising a quantum error correction module.

Combination 22: A method for operating a control unit for controlling a data transfer between a classical processor and a quantum processor with a plurality of qubits, the control unit comprising a plurality of control and read-out circuits configured for controlling and reading out the plurality of qubits, each of the control and read-out circuits of the plurality of control and read-out circuits being assigned to one or more of the qubits of the plurality of qubits, the method comprising:

receiving instructions from the classical processor, controlling the quantum processor in order to execute the instructions, the controlling of the quantum processor comprising selectively powering on a subset of control and read-out circuits of the plurality of control and read-out circuits during an instruction cycle, while ensuring that the remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the data read out from the qubits to the classical processor.

Combination 23: A quantum computer comprising a quantum processor, the quantum processor comprising a plurality of qubits, the quantum computer further comprising a control unit for controlling a data transfer between a classical processor and the quantum processor, the control unit comprising a plurality of control and read-out circuits configured for controlling and reading out the plurality of qubits, each of the control and read-out circuits of the plurality of control and read-out circuits being assigned to one or more of the qubits of the plurality of qubits, the control unit being configured for:

receiving instructions from the classical processor, controlling the quantum processor in order to execute the instructions, the controlling of the quantum processor comprising selectively powering on a subset of control and read-out circuits of the plurality of control and read-out circuits during an instruction cycle, while ensuring that the remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the data read out from the qubits to the classical processor.

Combination 24: A computational system comprising a classical processor and a quantum processor, the quantum processor comprising a plurality of qubits, the computational system further comprising a control unit for controlling a data transfer between the classical processor and the quantum processor, the control unit comprising a plurality of control and read-out circuits configured for controlling and reading out the plurality of qubits, each of the control and read-out circuits of the plurality of control and read-out circuits being assigned to one or more of the qubits of the plurality of qubits, the control unit being configured for:

receiving instructions from the classical processor, controlling the quantum processor in order to execute the instructions, the controlling of the quantum processor comprising selectively powering on a subset of control and read-out circuits of the plurality of control and read-out circuits during an instruction cycle, while ensuring that the remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the data read out from the qubits to the classical processor.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A control unit for controlling a data transfer between a classical processor and a quantum processor with a plurality of qubits,
the control unit comprising a plurality of control and read-out circuits configured for controlling and reading out the plurality of qubits, each of the control and read-out circuits of the plurality of control and read-out circuits being assigned to one or more of the qubits of the plurality of qubits, the control unit being configured for:
receiving instructions from the classical processor,
controlling the quantum processor in order to execute the instructions,
  the controlling of the quantum processor comprising selectively powering on a subset of control and read-out circuits of the plurality of control and read-out circuits during an instruction cycle, while ensuring that a remaining control and read-out circuits of the plurality of control and read-out circuits are powered off during the instruction cycle, the subset of control and read-out circuits comprising less control and read-out circuits than the plurality of control and read-out circuits,
  using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned,
transmitting the read out data from the qubits to the classical processor.

2. The control unit of claim 1, the control unit being a cryogenic control unit operated at a cryogenic temperature.

3. The control unit of claim 2, the cryogenic temperature, at which the control unit is operated, being a temperature within a temperature range of 1 K to 4 K.

4. The control unit of claim 1, the plurality of control and read-out circuits comprising a number of control and read-out circuits equal to a number of qubits comprised by the plurality of qubits with each of the control and read-out circuits of the plurality of control and read-out circuits being assigned to one of the qubits of the plurality of qubits.

5. The control unit of claim 1, a number of control and read-out circuits being smaller than the number of qubits with each of the control and read-out circuits of the plurality of control and read-out circuits being assigned to more than one qubit of the plurality of qubits.

6. The control unit of claim 5, with multiplexing being used by each of the control and read-out circuits of the plurality of control and read-out circuits to be able to control and read out the more than one qubits of the plurality of qubits assigned to a respective control and read-out circuit in parallel.

7. The control unit of claim 1, each of the control and read-out circuits of the plurality of control and read-out circuits comprising a control digital-to-analog converter configured for generating control pulses for controlling the qubits assigned to a respective control and read-out circuit, the control digital-to-analog converter further being configured for generating read-out pulses for reading out the qubits assigned to the respective control and read-out circuit.

8. The control unit of claim 7, each of the control digital-to-analog converters comprising a memory for storing control patterns for controlling the qubits assigned to the control and read-out circuit comprising the respective control digital-to-analog converter.

9. The control unit of claim 1, each of the control and read-out circuits of the plurality of control and read-out circuits comprising a bias digital-to-analog converter configured for providing one or more of the following for the qubits assigned to a respective control and read-out circuit: a direct current bias, a direct voltage bias.

10. The control unit of claim 1, each of the control and read-out circuits of the plurality of control and read-out circuits comprising an analog-to-digital converter configured for receiving read-out data from the qubits assigned to a respective control and read-out circuit.

11. The control unit of claim 1, each of the control and read-out circuits of the plurality of control and read-out circuits comprising a low noise amplifier configured for amplifying signals comprising the read-out data from the qubits assigned to a respective control and read-out circuit for an analog-to-digital converter of the respective control and read-out circuit.

12. The control unit of claim 1, the control unit comprising a transceiver configured for executing the receiving of the instructions from the classical processor and the transmitting of the read out data from the qubits to the classical processor.

13. The control unit of claim 1, the control unit comprising a clock data recovery module configured for generating a reference clock signal for the plurality of control and read-out circuits.

14. The control unit of claim 1, the control unit comprising a waveform pattern generator configured for generating control patterns used by digital-to-analog converters for controlling the qubits.

15. The control unit of claim 1, the control unit comprising a power-on sequence generator configured for generating a power-on sequence for powering on the control and read-out circuits of the subset of control and read-out circuits.

16. The control unit of claim 1, the control unit comprising a phase/amplitude shift calculator module for determining quantum mechanical states of the qubits using the read out data from the qubits.

17. The control unit of claim 1, the control unit comprising a data packaging module configured for packaging the read out data from the qubits for the transmitting to the classical processor.

18. The control unit of claim 1, the control unit comprising a synchronizer module configured for synchronizing operations executed by the control unit.

19. The control unit of claim 1, the control unit comprising a memory for storing the received instructions from the classical processor.

20. The control unit of claim 1, the control unit comprising an instruction decoder configured for decoding the received instructions from the classical processor.

21. The control unit of claim 1, the control unit comprising a quantum error correction module.

22. A method for operating a control unit for controlling a data transfer between a classical processor and a quantum processor with a plurality of qubits,
  the control unit comprising a plurality of control and read-out circuits configured for controlling and reading out the plurality of qubits, each of the control and read-out circuits of the plurality of control and read-out circuits being assigned to one or more of the qubits of the plurality of qubits,
  the method comprising:
  receiving instructions from the classical processor,
  controlling the quantum processor in order to execute the instructions,
    the controlling of the quantum processor comprising selectively powering on a subset of control and read-out circuits of the plurality of control and read-out circuits during an instruction cycle, while ensuring that a remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the read out data from the qubits to the classical processor.

23. A quantum computer comprising a quantum processor, the quantum processor comprising a plurality of qubits, the quantum computer further comprising a control unit for controlling a data transfer between a classical processor and the quantum processor, the control unit comprising a plurality of control and read-out circuits configured for controlling and reading out the plurality of qubits, each of the control and read-out circuits of the plurality of control and read-out circuits being assigned to one or more of the qubits of the plurality of qubits, the control unit being configured for:

receiving instructions from the classical processor, controlling the quantum processor in order to execute the instructions, the controlling of the quantum processor comprising selectively powering on a subset of control and read-out circuits of the plurality of control and read-out circuits during an instruction cycle, while ensuring that a remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the read out data from the qubits to the classical processor.

24. A computational system comprising a classical processor and a quantum processor, the quantum processor comprising a plurality of qubits, the computational system further comprising a control unit for controlling a data transfer between the classical processor and the quantum processor, the control unit comprising a plurality of control and read-out circuits configured for controlling and reading out the plurality of qubits, each of the control and read-out circuits of the plurality of control and read-out circuits being assigned to one or more of the qubits of the plurality of qubits, the control unit being configured for:

receiving instructions from the classical processor, controlling the quantum processor in order to execute the instructions, the controlling of the quantum processor comprising selectively powering on a subset of control and read-out circuits of the plurality of control and read-out circuits during an instruction cycle, while ensuring that a remaining control and read-out circuits of the plurality of control and read-out circuits are powered off during the instruction cycle, the subset of control and read-out circuits comprising less control and read-out circuits than the plurality of control and read-out circuits, using the powered-on subset of control and read-out circuits to control a subset of qubits of the plurality of qubits and to read out data from the subset of qubits, the subset of qubits comprising those qubits of the plurality of qubits to which the control and read-out circuits of the powered-on subset of control and read-out circuits are assigned, transmitting the read out data from the qubits to the classical processor.

* * * * *